United States Patent
Sasaki et al.

(10) Patent No.: US 11,125,116 B2
(45) Date of Patent: Sep. 21, 2021

(54) LIFTING JIG, DISASSEMBLING METHOD OF STEAM TURBINE, COMPONENT REPLACEMENT METHOD OF STEAM TURBINE, AND MANUFACTURING METHOD OF STEAM TURBINE

(71) Applicant: MITSUBISHI HEAVY INDUSTRIES COMPRESSOR CORPORATION, Tokyo (JP)

(72) Inventors: Yuichi Sasaki, Hiroshima (JP); Kyoichi Ikeno, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 173 days.

(21) Appl. No.: 16/502,818

(22) Filed: Jul. 3, 2019

(65) Prior Publication Data

US 2020/0011205 A1 Jan. 9, 2020

(30) Foreign Application Priority Data

Jul. 6, 2018 (JP) .............................. JP2018-129001

(51) Int. Cl.
| | |
|---|---|
| *B23P 21/00* | (2006.01) |
| *F01D 25/28* | (2006.01) |
| *B66C 1/62* | (2006.01) |
| *B66C 1/42* | (2006.01) |

(52) U.S. Cl.
CPC .............. *F01D 25/285* (2013.01); *B66C 1/42* (2013.01); *B66C 1/62* (2013.01); *B23P 21/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,082,963 | A * | 7/2000 | Sexton | F01D 11/24 415/115 |
| 8,419,357 | B2 * | 4/2013 | Haje | F01D 11/005 415/176 |
| 8,662,821 | B2 * | 3/2014 | Chevrette | F01K 7/16 415/1 |
| 9,500,130 | B2 * | 11/2016 | Swan | F01D 9/042 |
| 11,022,000 | B2 * | 6/2021 | Terada | F01D 9/04 |
| 2010/0054925 | A1 * | 3/2010 | Haje | F01D 11/005 415/177 |

(Continued)

FOREIGN PATENT DOCUMENTS

JP H06-55385 A 3/1994

*Primary Examiner* — Lawrence Averick
(74) *Attorney, Agent, or Firm* — Osha Bergman Watanabe & Burton LLP

(57) ABSTRACT

A lifting jig can lift a rotor and a diaphragm of a steam turbine including a casing that covers the rotor that can be divided with a division surface and the diaphragm that can be divided into an upper half diaphragm and a lower half diaphragm with a division surface. A lifting jig has a diaphragm fixing unit that can be fixed to the upper half diaphragm, a first rotor supporting unit that is integrally formed with a diaphragm fixing unit and can support one end portion of the rotor in an axial direction, and a second rotor supporting unit that is integrally formed with the diaphragm fixing unit and can support the other end portion of the rotor in the axial direction.

7 Claims, 10 Drawing Sheets

(56) References Cited

U.S. PATENT DOCUMENTS

| | | | |
|---|---|---|---|
| 2012/0171010 A1* | 7/2012 | Chevrette | F01D 25/285 415/1 |
| 2014/0250915 A1* | 9/2014 | Swan | F01D 9/04 60/796 |
| 2019/0186298 A1* | 6/2019 | Terada | F01D 25/246 |
| 2019/0211710 A1* | 7/2019 | Terada | F01D 25/243 |
| 2019/0277139 A1* | 9/2019 | Matsumoto | F01D 25/26 |

* cited by examiner

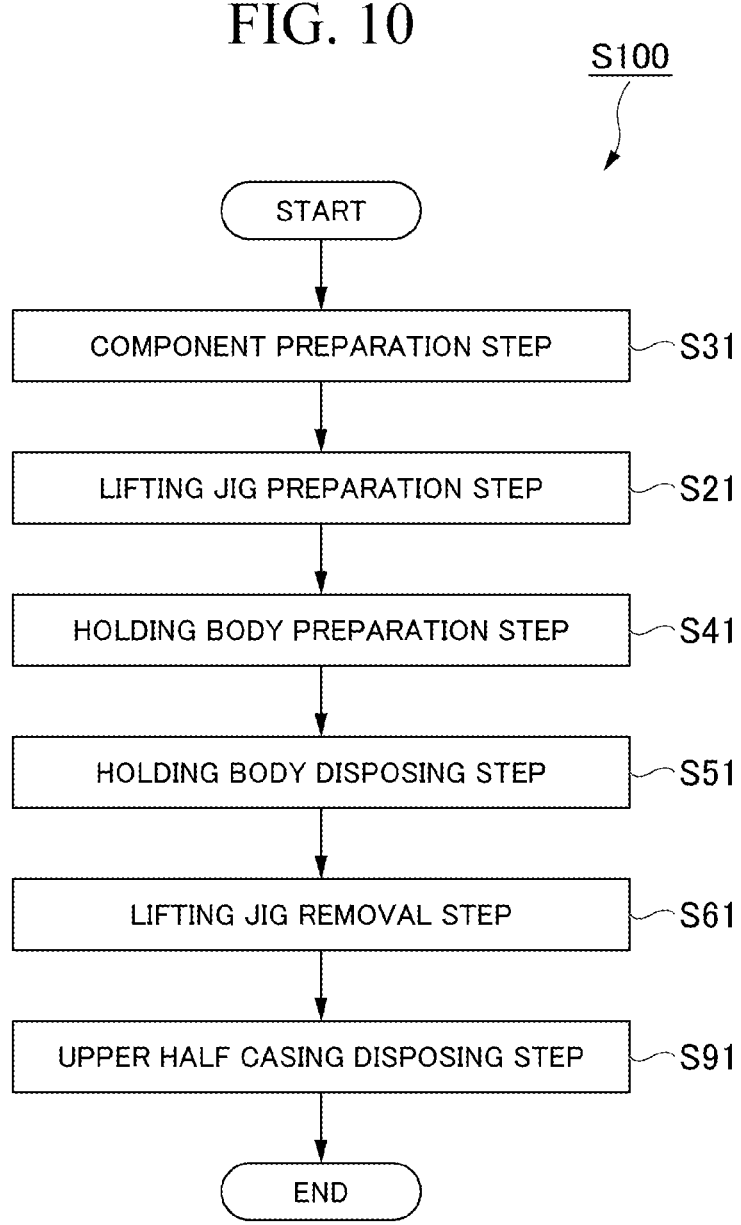

LIFTING JIG, DISASSEMBLING METHOD OF STEAM TURBINE, COMPONENT REPLACEMENT METHOD OF STEAM TURBINE, AND MANUFACTURING METHOD OF STEAM TURBINE

BACKGROUND

Field

The present disclosure relates to a lifting jig, a disassembling method of a steam turbine, a component replacement method of a steam turbine, and a manufacturing method of a steam turbine.

Priority is claimed on Japanese Patent Application No. 2018-129001, filed on Jul. 6, 2018, the contents of which are incorporated herein by reference.

Description of Related Art

A steam turbine includes a rotor rotating about an axis and a casing covering the rotor. The rotor has a rotor shaft extending in an axial direction having the axis as a center and a plurality of blades disposed around the rotor shaft. In the casing, a diaphragm having a plurality of nozzles (vanes) disposed around the rotor is fixed to an upstream side of each blade. Some of such steam turbines have a structure in which the cylindrical casing and the annular diaphragm are divided up and down, in view of assembly thereof.

An assembling method of a steam turbine including a casing and an internal casing (diaphragm), which are divided up and down, are disclosed in Japanese Unexamined Patent Application, First Publication No. H6-55385. In the assembling method of a steam turbine, an inner diameter of the internal casing is measured before and after assembling an upper half component, and a changed amount is acquired. Accordingly, the alignment adjustment of the casing at the time of assembly is simplified.

SUMMARY

However, in a case of assembling the steam turbine having the structure in which the casing and the diaphragm are divided up and down, components are disposed in order of the rotor, an upper half diaphragm, and an upper half casing after a lower half diaphragm is disposed with respect to a lower half casing. Conversely, in a case of maintaining or dismantling the steam turbine, the components are removed in order of the upper half casing, the upper half diaphragm, the rotor, and the lower half diaphragm. For this reason, a large amount of time is required until the disassembly or assembly of the steam turbine is completed. As steam turbines become larger, each work becomes large-scale work, and takes weeks in some cases. For this reason, it is desirable to perform disassembly and assembly in a short period of time.

An object of the present disclosure is to provide a lifting jig, a disassembling method of a steam turbine, a component replacement method of a steam turbine, and a manufacturing method of a steam turbine, in which disassembly and assembly can be performed in a short period of time.

According to a first aspect of the present disclosure, there is provided a lifting jig that is configured to lift a rotor and a diaphragm of a steam turbine including the rotor that is rotatable about an axis, a casing that is divided with a division surface into an upper half casing on an upper side of a vertical direction and a lower half casing on a lower side of the vertical direction and covers the rotor, and the diaphragm that is divided with a division surface into an upper half diaphragm disposed in the upper half casing and a lower half diaphragm disposed in the lower half casing and extends in a circumferential direction of the rotor. The lifting jig includes a diaphragm fixing unit that is fixable to the upper half diaphragm, a first rotor supporting unit that is integrally formed with the diaphragm fixing unit and that is configured to support one end portion of the rotor in an axial direction where the axis extends, and a second rotor supporting unit that is integrally formed with the diaphragm fixing unit at a position separated away from the first rotor supporting unit in the axial direction and that is configured to support the other end portion of the rotor in the axial direction.

In such a configuration, the diaphragm and the rotor can be simultaneously lifted with one jig. The first rotor supporting unit and the second rotor supporting unit, which support the rotor, are integrally formed with the diaphragm fixing unit to which the upper half diaphragm is fixed. For this reason, even when the rotor and the diaphragm are moved, a relative position of the rotor with respect to the upper half diaphragm can be maintained without a significant shift. Therefore, work such as position adjustment when moving the rotor and the diaphragm can be reduced.

According to a second aspect of the present disclosure, in the lifting jig of the first aspect, the first rotor supporting unit and the second rotor supporting unit are configured to regulate a movement range of the rotor in the vertical direction to be within a range smaller than a distance of a minimum gap between the upper half diaphragm and the rotor in the vertical direction.

In such a configuration, even when the rotor and the diaphragm are moved by the lifting jig, relatively large movement of the rotor with respect to the upper half diaphragm can be suppressed while on the move. Therefore, the diaphragm and the rotor can be prevented from coming into contact with each other.

According to a third aspect of the present disclosure, in the lifting jig of the first or second aspect, the first rotor supporting unit may have a first insertion hole that allows the rotor to be inserted therein. The second rotor supporting unit may have a second insertion hole that allows the rotor to be inserted therein. In the first insertion hole and the second insertion hole, a distance from an outer circumferential surface of the rotor to an inner circumferential surface of the first insertion hole or the second insertion hole in the vertical direction may be shorter than the distance of the minimum gap.

In such a configuration, even when the relative position of the rotor with respect to the diaphragm shifts while the rotor and the diaphragm are being moved by the lifting jig, the outer circumferential surface of the rotor comes into contact with the inner circumferential surfaces of the first insertion hole and the second insertion hole before the rotor and the diaphragm come into contact with each other. Therefore, the rotor and the diaphragm can be prevented from coming into contact with each other while on the move.

According to a fourth aspect of the present disclosure, in the lifting jig of any one of the first to third aspects, at least one of the first rotor supporting unit and the second rotor supporting unit may have an axial direction position adjusting unit that is configured to adjust a position of the rotor in the axial direction.

In such a configuration, even when the rotor and the diaphragm are moved by the lifting jig, the movement of the rotor, which is on the move, in the axial direction can be suppressed by the first rotor supporting unit and the second rotor supporting unit. Therefore, the rotor and the diaphragm can be prevented from coming into contact with each other while on the move.

According to a fifth aspect of the present disclosure, in the lifting jig of any one of the first to fourth aspects, the steam turbine may include, outside the casing, a bearing unit that rotatably supports the rotor. The bearing unit may have a bearing main body that supports the rotor by using a lubricating oil, a bearing housing that accommodates the bearing main body, and an oil slinger unit that is provided at an interval with respect to an oil slinger groove formed to be depressed from an outer circumferential surface of the rotor and suppresses leakage of the lubricating oil from an inside of the bearing housing to an outside. The axial direction position adjusting unit may have an adjusting protrusion portion that is allowed to be inserted into the oil slinger groove.

In such a configuration, the movement of the rotor, which is on the move, in the axial direction can be adjusted by the adjusting protrusion portion with the use of the oil slinger groove.

According to a sixth aspect of the present disclosure, there is provided a disassembling method of a steam turbine including a rotor that is rotatable about an axis, a casing that is divided with a division surface into an upper half casing on an upper side of a vertical direction and a lower half casing on a lower side of the vertical direction and covers the rotor, and a diaphragm that is divided with a division surface into an upper half diaphragm disposed in the upper half casing and a lower half diaphragm disposed in the lower half casing and extends in a circumferential direction of the rotor. The disassembling method of a steam turbine includes lifting jig preparing of preparing a lifting jig having a diaphragm fixing unit that is fixable to the upper half diaphragm, a first rotor supporting unit that is integrally formed with the diaphragm fixing unit and that is configured to support one end portion of the rotor in an axial direction where the axis extends, and a second rotor supporting unit that is integrally formed with the diaphragm fixing unit at a position separated away from the first rotor supporting unit in the axial direction and that is configured to support an other end portion of the rotor in the axial direction, upper side opening of opening an upper side of the upper half diaphragm by lifting the upper half casing placed on the lower half casing to the upper side of the vertical direction to remove the upper half casing, lifting jig attaching of attaching the lifting jig prepared in the lifting jig preparing such that the upper half diaphragm that is fixed to the lower half diaphragm, which is in a state of being disposed on an inner circumferential side of the lower half casing, is fixed to the diaphragm fixing unit, and the rotor is supported by the first rotor supporting unit and the second rotor supporting unit, after the upper side opening, and internal component removing of removing the rotor and the diaphragm from the lower half casing by lifting the lifting jig from the lower half casing to the upper side of the vertical direction after the lifting jig attaching.

In such a configuration, the rotor and the diaphragm can be simultaneously removed from the lower half casing by the lifting jig. Work time taken for disassembling the steam turbine can be reduced.

According to a seventh aspect of the present disclosure, there is provided a component replacement method of a steam turbine including the disassembling method of a steam turbine according to the sixth aspect, holding body preparing of preparing a holding body, in which relative positions of the rotor and the diaphragm with respect to the lifting jig are held, by fixing the lower half diaphragm to the upper half diaphragm, after the upper half diaphragm is fixed to the diaphragm fixing unit and the rotor is supported by the first rotor supporting unit and the second rotor supporting unit, holding body disposing of disposing the holding body prepared in the holding body preparing by lowering the holding body to the lower half casing from an upper side of the vertical direction and disposing the lower half diaphragm on an inner circumferential side of the lower half casing, lifting jig removing of removing the lifting jig from the rotor and the upper half diaphragm after the holding body disposing, and upper half casing disposing of disposing the upper half casing by lowering the upper half casing to the lower half casing from the upper side of the vertical direction after the lifting jig removing, disposing the upper half diaphragm on an inner circumferential side of the upper half casing, and bringing a division surface of the upper half casing into contact with a division surface of the lower half casing. The holding body disposing is executed after the internal component removing in the disassembling method of a steam turbine.

In such a configuration, position adjustment between components when disposing the rotor and the diaphragm with respect to the lower half casing can be omitted by attaching the holding body prepared beforehand to the lower half casing. Therefore, work time taken for replacing the internal components of the steam turbine such as maintenance time can be significantly reduced.

According to an eighth aspect of the present disclosure, in the component replacement method of a steam turbine of the seventh aspect, new component preparing of newly preparing the upper half diaphragm, the lower half diaphragm, and the rotor may be further included. In the holding body preparing, the holding body may be formed by using the upper half diaphragm, the lower half diaphragm, and the rotor which are newly prepared in the new component preparing.

In such a configuration, by forming the holding body with new components, the rotor and the diaphragm can be attached to the lower half casing immediately after removing the rotor and the diaphragm from the lower half casing. Therefore, time it takes for the steam turbine to be in an operable state can be significantly reduced compared to a case of returning the removed rotor and the removed diaphragm after repair is performed thereon.

According to a ninth aspect of the present disclosure, there is provided a manufacturing method of a steam turbine including a rotor that is rotatable about an axis, a casing that is divided with a division surface into an upper half casing on an upper side of a vertical direction and a lower half casing on a lower side of the vertical direction and covers the rotor, and a diaphragm that is divided with a division surface into an upper half diaphragm disposed in the upper half casing and a lower half diaphragm disposed in the lower half casing and extends in a circumferential direction of the rotor. The manufacturing method of a steam turbine includes component preparing of preparing the rotor, the upper half casing, the lower half casing, the upper half diaphragm, and the lower half diaphragm, lifting jig preparing of preparing a lifting jig having a diaphragm fixing unit that is fixable to the upper half diaphragm prepared in the component preparing, a first rotor supporting unit that is integrally formed with the diaphragm fixing unit and that is configured to support one end portion of the rotor in an axial direction where the axis extends, and a second rotor supporting unit that is integrally formed with the diaphragm fixing unit at a position separated away from the first rotor supporting unit in the axial direction and that is configured to support an other end portion of the rotor in the axial direction, holding body preparing of preparing a holding body in which relative positions of the rotor and the diaphragm with respect to the lifting jig are held by fixing the lower half diaphragm to the upper half diaphragm, after the upper half diaphragm is fixed to the diaphragm fixing unit of the lifting jig prepared in the lifting jig preparing and the rotor is supported by the first rotor supporting unit and the second rotor supporting unit, holding body disposing of disposing the holding body prepared in the holding body preparing by lowering the holding body to the lower half casing prepared in the component preparing from an upper side of the vertical direction and disposing the lower half diaphragm on an inner circumferential side of the lower half casing, lifting jig removing of removing the lifting jig from the rotor and the upper half diaphragm after the holding body disposing, and upper half casing disposing of disposing the upper half casing by lowering the upper half casing to the lower half casing from the upper side of the vertical direction after the lifting jig removing, disposing the upper half diaphragm on an inner circumferential side of the upper half casing, and bringing a division surface of the upper half casing into contact with a division surface of the lower half casing.

In the present disclosure, the steam turbine can be disassembled and assembled in a short period of time.

BRIEF DESCRIPTION OF THE DRAWINGS

FIG. 10 is a flow chart of a manufacturing method of a steam turbine of a second embodiment of the present disclosure.

DETAILED DESCRIPTION OF THE DISCLOSURE

Hereinafter, a steam turbine 1 of embodiments of the present disclosure will be described in detail with reference to the drawings.

Figure 1:
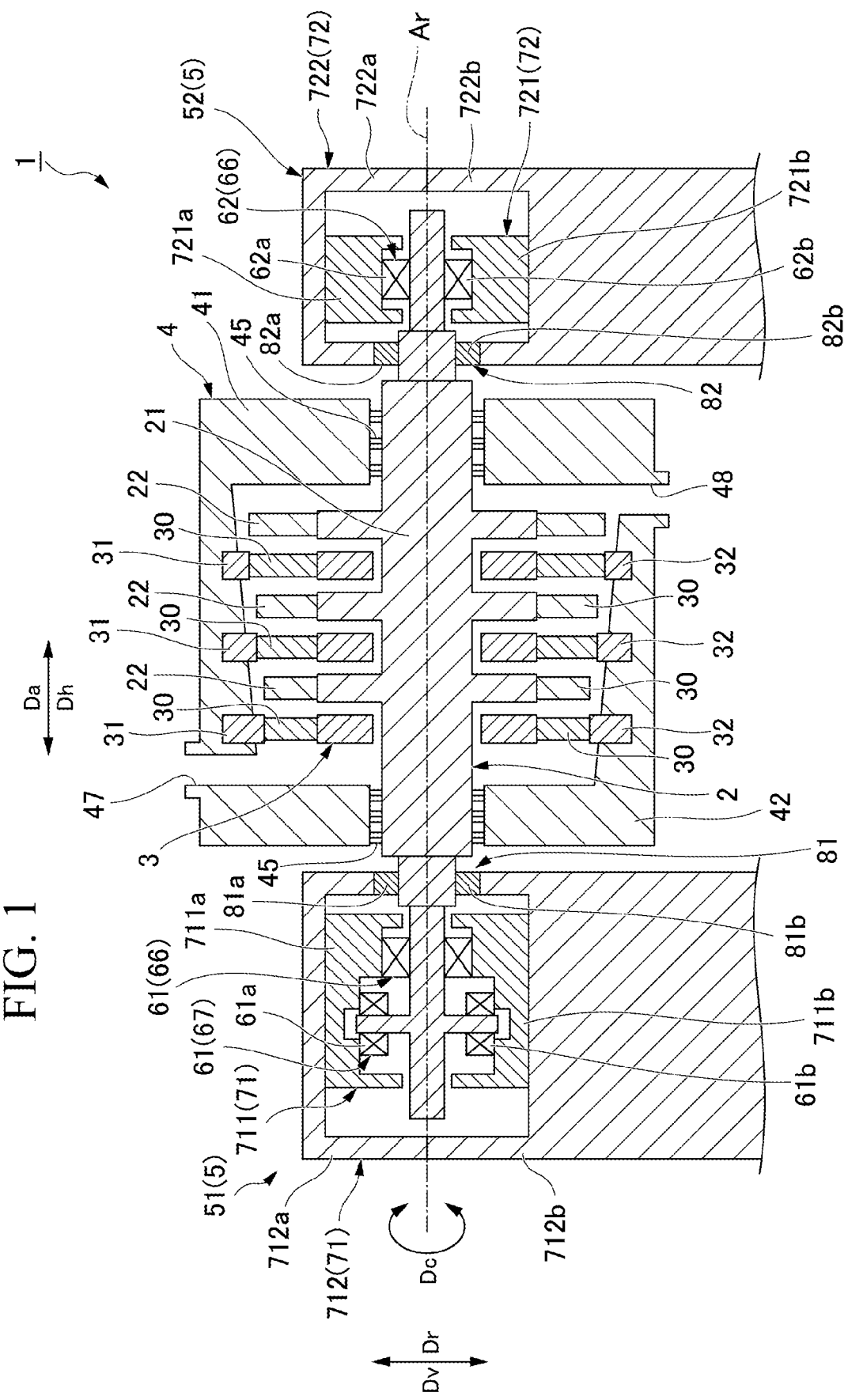
FIG. 1 is a sectional view of a steam turbine of an embodiment of the present disclosure.

As shown in FIG. 1, the steam turbine 1 includes a rotor 2, a diaphragm 3, a casing 4, and a bearing unit 5.

The rotor 2 is rotatable about an axis Ar. The rotor 2 has a rotor shaft 21 which has the axis Ar as a center and extends in an axial direction Da and a plurality of blades 22 which are arranged in a circumferential direction Dc of the rotor shaft 21 and are fixed to the rotor shaft 21.

Hereinafter, a direction where the axis Ar extends will be referred to as the axial direction Da. A radial direction of the axis Ar will be simply referred to as a radial direction Dr. A page upward direction of FIG. 1 of the radial direction Dr will be referred to as a vertical direction Dv. A right-and-left direction of FIG. 1 will be referred to as a horizontal direction Dh orthogonal to the vertical direction Dv. In addition, a direction around the rotor 2 having the axis Ar as a center will be referred to as the circumferential direction Dc.

The diaphragm 3 is disposed on an outer circumferential side of the rotor 2. The diaphragm 3 has an annular shape having the axis Ar as a center. A plurality of nozzles (vane) 30 arranged in the circumferential direction Dc are provided in the annular diaphragm 3 near a middle of the diaphragm 3 in the radial direction Dr, and at upstream positions of the blades 22 of the rotor 2 in the axial direction Da. In the steam turbine 1, there is a tubular space on the outer circumferential side of the rotor shaft 21 and near the middle of the annular diaphragm 3, in other words, a space where the blades 22 and the nozzles 30 are disposed is a steam flow passage where steam, which is a working fluid, flows. The annular diaphragm 3 has upper half diaphragms 31 above the axis Ar of the rotor 2 in the vertical direction Dv and lower half diaphragms 32 below the axis. Description of the upper half diaphragms 31 and the lower half diaphragms 32 will be made later.

The casing 4 is disposed on the outer circumferential side of the diaphragm 3. The casing 4 has a tubular shape having the axis Ar as a center. The rotor shaft 21 protrudes from openings formed at both ends of the casing 4 in the axial direction Da. In the openings at both ends of the tubular casing 4, seal devices 45, each of which includes a labyrinth seal sealing between the rotor shaft 21 and the casing, are provided. In addition, an inlet port 47 that leads steam to the steam flow passage and an exhaust port 48 that discharges the steam flowed in the steam flow passage to the outside are formed in the casing 4. The casing 4 has an upper half casing 41 above the axis Ar of the rotor 2 and a lower half casing 42 below the axis.

The upper half casing 41 extends in the circumferential direction Dc. A section of the upper half casing 41 orthogonal to the axis Ar has a semicircular shape having the axis Ar as a center. The upper half casing 41 is open toward a lower side of the vertical direction Dv such that the rotor 2 and the diaphragm 3 can be accommodated. At both ends of the upper half casing 41 in the circumferential direction Dc, there are division surfaces (upper half casing division surfaces). The division surfaces of the upper half casing 41 are horizontal surfaces facing the lower side of the vertical direction Dv.

The lower half casing 42 extends in the circumferential direction Dc. A section of the lower half casing 42 orthogonal to the axis Ar has a semicircular shape having the axis Ar as a center. The lower half casing 42 is formed to have an inner diameter having the same size as an inner diameter of the upper half casing 41. The lower half casing 42 is open toward an upper side of the vertical direction Dv such that the rotor 2 and the diaphragm 3 can be accommodated. At both ends of the lower half casing 42 in the circumferential direction Dc, there are division surfaces (lower half casing division surfaces). The division surfaces of the lower half casing 42 are horizontal surfaces facing the upper side of the vertical direction Dv. The upper half casing 41 is placed above the lower half casing 42 in the vertical direction Dv, and the upper half casing is fixed to the lower half casing by a fastening member such as a bolt (not shown) in a state where the division surfaces thereof are in contact with each other. Accordingly, the casing 4 is formed.

The upper half diaphragms 31 extend in the circumferential direction Dc. The upper half diaphragms 31 are fixed to the upper half casing 41 in a state of being accommodated inside the upper half casing 41. A section of each of the upper half diaphragms 31 orthogonal to the axis Ar has a semicircular shape having the axis Ar as a center. The upper half diaphragms 31 are open toward the lower side of the vertical direction Dv such that the rotor 2 is fitted in. At both ends of each of the upper half diaphragms 31 in the circumferential direction Dc, there are division surfaces (upper half diaphragm division surfaces). The division surfaces of each of the upper half diaphragms 31 are horizontal surfaces facing the lower side of the vertical direction Dv.

The lower half diaphragms 32 extend in the circumferential direction Dc. The lower half diaphragms 32 are fixed to the lower half casing 42 in a state of being accommodated inside the lower half casing 42. A section of each of the lower half diaphragms 32 orthogonal to the axis Ar has a semicircular shape having the axis Ar as a center. The lower half diaphragms 32 are open toward the upper side of the vertical direction Dv such that the rotor 2 is fitted in. At both ends of each of the lower half diaphragms 32 in the circumferential direction Dc, there are division surfaces (lower half diaphragm division surfaces). The division surfaces of each of the lower half diaphragms 32 are horizontal surfaces facing the upper side of the vertical direction Dv. The upper half diaphragms 31 are placed above the lower half diaphragms 32 in the vertical direction Dv, and the upper half diaphragms are fixed to the lower half diaphragms by a fastening member such as a bolt (not shown) in a state where the division surfaces thereof are in contact with each other. Accordingly, the diaphragm 3 is formed.

The bearing unit 5 rotatably supports the rotor shaft 21 with the axis Ar as a center. The bearing unit 5 is disposed outside the casing 4. The bearing unit 5 has a governor side bearing unit 51 and an exhaust side bearing unit 52.

The governor side bearing unit 51 is provided on one side of the axial direction Da with respect to the casing 4 (an upstream side in the steam turbine 1). The governor side bearing unit 51 has a thrust bearing unit 61, a governor side bearing housing 71, and a governor side oil slinger unit 81.

The thrust bearing unit 61 supports the rotor 2 with the use of a lubricating oil. The thrust bearing unit 61 of the embodiment has a journal bearing 66 and a thrust bearing 67 which are types using a lubricating oil. The journal bearing 66 receives a load in the radial direction Dr, which acts on the rotor shaft 21. The thrust bearing 67 receives a load in the axial direction Da, which acts on the rotor shaft 21. The thrust bearing 67 is disposed on one side of the axial direction Da with respect to the journal bearing 66 (at a position separated away from the casing 4).

The governor side bearing housing 71 accommodates the thrust bearing unit 61. The governor side bearing housing 71 has a governor side housing 711 and a governor side pedestal cover 712. The governor side housing 711 is a box-shaped member that covers the journal bearing 66 and the thrust bearing 67. The governor side housing 711 is fixed to the journal bearing 66 and the thrust bearing 67. Two through-holes that allow the rotor shaft 21 to be inserted therein are formed in the governor side housing 711 to insert the rotor shaft 21. The governor side pedestal cover 712 is mounted on a floor and supports the governor side housing 711. The governor side pedestal cover 712 is provided on one side of the axial direction Da with respect to the casing 4. The governor side pedestal cover 712 covers the governor side housing 711. Only one through-hole that allows the rotor shaft 21 to be inserted therein is formed in the governor side pedestal cover 712 such that an end portion of the rotor shaft 21, which is on one side of the axial direction Da, is covered.

Figure 3:
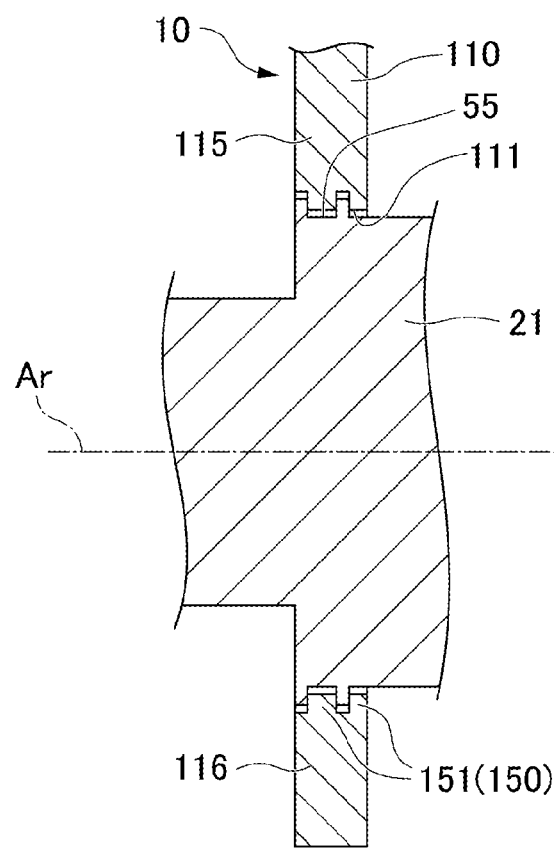
FIG. 3 is a main portion sectional view showing a vicinity of an oil slinger unit to which the lifting jig of the present disclosure is attached.
Figure 4:
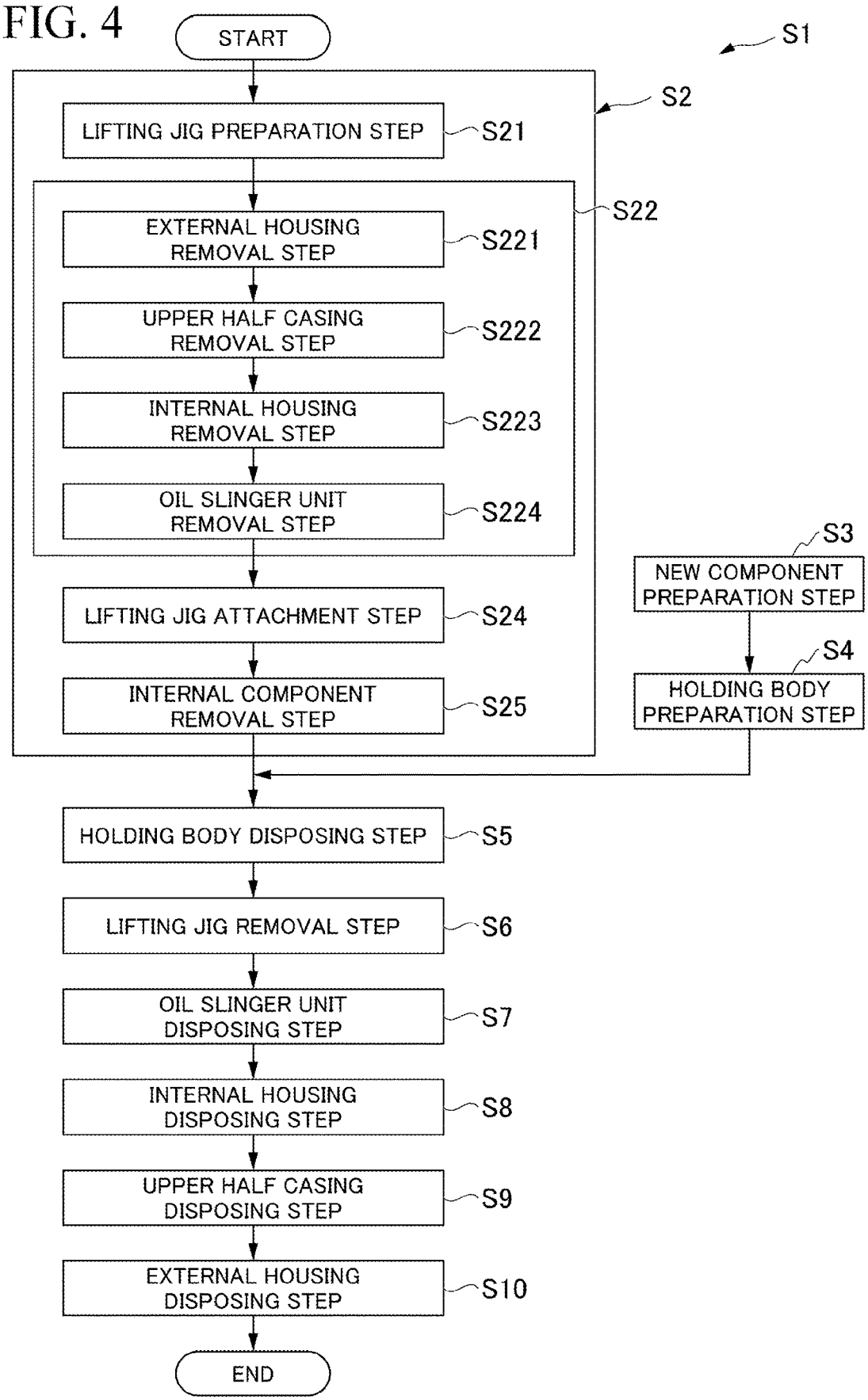
FIG. 4 is a flow chart of a component replacement method of a steam turbine of a first embodiment of the present disclosure.

The governor side oil slinger unit 81 suppresses the leakage of a lubricating oil from an inside of the governor side pedestal cover 712 to the outside. The governor side oil slinger unit 81 is provided between an inner circumferential surface of the through-hole in the governor side pedestal cover 712 and an outer circumferential surface of the rotor shaft 21. The governor side oil slinger unit 81 is fixed to the governor side pedestal cover 712 at an interval with respect to an oil slinger groove 55 (refer to FIG. 3) formed to be depressed from an outer circumferential surface of the rotor 2. The governor side oil slinger unit 81 has unevenness provided between the rotor shaft 21 and the governor side pedestal cover 712 due to the oil slinger groove 55 or a fin (not shown) and prevents the leakage of a lubricant with the use of centrifugal force.

The governor side bearing unit 51 can be divided up and down with a horizontal surface that passes through the axis Ar as reference. Therefore, the thrust bearing unit 61, the governor side housing 711, the governor side pedestal cover 712, and the governor side oil slinger unit 81 in the governor side bearing unit 51 can be divided up and down in the vertical direction Dv with the horizontal surface that passes through the axis Ar as a division surface. Specifically, the thrust bearing unit 61 can be divided into an upper half thrust bearing 61a and a lower half thrust bearing 61b. The governor side housing 711 can be divided into an upper half governor side housing 711a and a lower half governor side housing 711b. The upper half governor side housing 711a is fixed to the upper half thrust bearing 61a. The lower half governor side housing 711b is fixed to the lower half thrust bearing 61b. The governor side pedestal cover 712 can be divided into a governor side cover 712a and a governor side pedestal 712b. The governor side oil slinger unit 81 can be divided into an upper half governor side oil slinger unit 81a and a lower half governor side oil slinger unit 81b.

The exhaust side bearing unit 52 is provided on the other side of the axial direction Da with respect to the casing 4 (a downstream in the steam turbine 1). The exhaust side bearing unit 52 has an exhaust side bearing 62, an exhaust side bearing housing 72, and an exhaust side oil slinger unit 82.

The exhaust side bearing 62 supports the rotor 2 with the use of a lubricating oil. The exhaust side bearing 62 of the embodiment has the journal bearing 66 which is a type using a lubricating oil. The journal bearing 66 of the exhaust side bearing 62 is the same as the journal bearing 66 of the thrust bearing unit 61.

The exhaust side bearing housing 72 accommodates the exhaust side bearing 62. The exhaust side bearing housing 72 has an exhaust side housing 721 and an exhaust side pedestal cover 722. The exhaust side housing 721 is a box-shaped member that covers the journal bearing 66 and is smaller than the governor side housing 711. The exhaust side housing 721 is fixed to the journal bearing 66. Two through-holes that allow the rotor shaft 21 to be inserted therein are formed in the exhaust side housing 721 to insert the rotor shaft 21. The exhaust side pedestal cover 722 is mounted on the floor and supports the exhaust side housing 721. The exhaust side pedestal cover 722 is provided on the other side of the axial direction Da with respect to the casing 4. That is, the exhaust side pedestal cover 722 is provided on an opposite side of the governor side pedestal cover 712 in the axial direction Da with the casing 4 interposed therebetween. The exhaust side pedestal cover 722 covers the exhaust side housing 721. Only one through-hole that allows the rotor shaft 21 to be inserted therein is formed in the exhaust side pedestal cover 722 such that an end portion of the rotor shaft 21, which is on the other side of the axial direction Da, is covered.

The exhaust side oil slinger unit 82 suppresses the leakage of a lubricating oil from an inside of the exhaust side pedestal cover 722 to the outside. The exhaust side oil slinger unit 82 has the same structure as the governor side oil slinger unit 81. That is, the exhaust side oil slinger unit 82 is provided at a position corresponding to the oil slinger groove 55 formed on the other side of the axial direction Da with respect to the casing 4. The exhaust side oil slinger unit 82 is provided between an inner circumferential surface of the through-hole in the exhaust side pedestal cover 722 and the outer circumferential surface of the rotor shaft 21.

The exhaust side bearing unit 52 can be divided up and down with the horizontal surface that passes through the axis Ar as reference. Therefore, the exhaust side bearing 62, the exhaust side housing 721, the exhaust side pedestal cover 722, and the exhaust side oil slinger unit 82 in the exhaust side bearing unit 52 can be divided up and down in the vertical direction Dv with the horizontal surface that passes through the axis Ar as a division surface. Specifically, the exhaust side bearing 62 can be divided into an upper half exhaust side bearing 62a and a lower half exhaust side bearing 62b. The exhaust side housing 721 can be divided into an upper half exhaust side housing 721a and a lower half exhaust side housing 721b. The upper half exhaust side housing 721a is fixed to the upper half exhaust side bearing 62a. The lower half exhaust side housing 721b is fixed to the lower half exhaust side bearing 62b. The exhaust side pedestal cover 722 can be divided into an exhaust side cover 722a and an exhaust side pedestal 722b. The exhaust side oil slinger unit 82 can be divided into an upper half exhaust side oil slinger unit 82a and a lower half exhaust side oil slinger unit 82b.

Next, a lifting jig 10 that can lift the rotor 2 and the diaphragm 3 according to the embodiment will be described.

Figure 2:
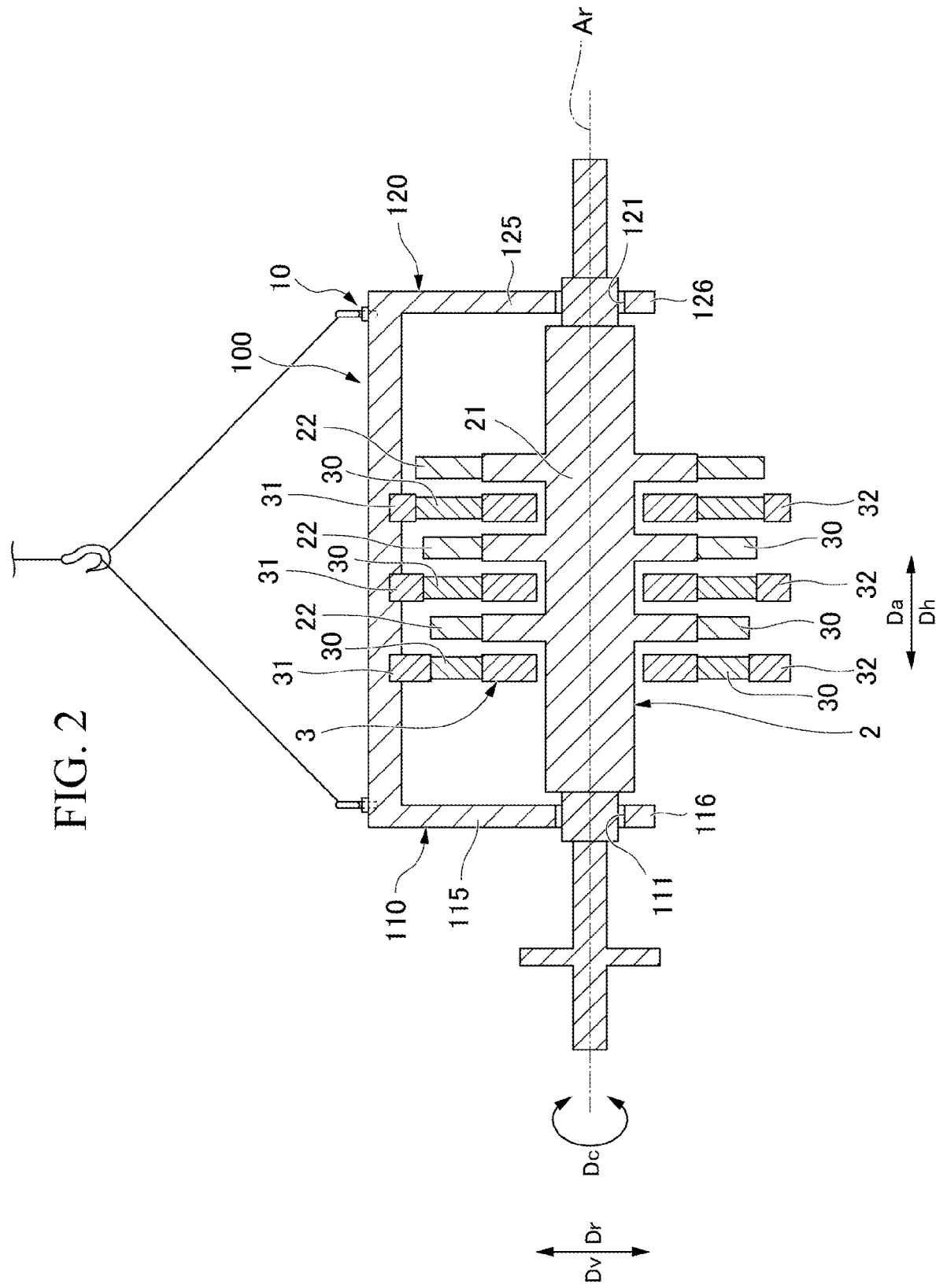
FIG. 2 is a sectional view showing a rotor and a diaphragm which are lifted by a lifting jig of the present disclosure.

As shown in FIG. 2, the lifting jig 10 can simultaneously lift the rotor 2 and the diaphragm 3 out of components of the steam turbine 1. The lifting jig 10 of the embodiment has a diaphragm fixing unit 100, a first rotor supporting unit 110, and a second rotor supporting unit 120.

The plurality of upper half diaphragms 31 can be fixed to the diaphragm fixing unit 100. The diaphragm fixing unit 100 can be fixed to each of the upper half diaphragms 31 from the outside by a fastening member such as a bolt (not shown). The diaphragm fixing unit 100 extends in the axial direction Da from a position in the rotor shaft 21, in which the oil slinger groove 55 corresponding to the governor side oil slinger unit 81 is formed, to a position in the rotor shaft, in which the oil slinger groove 55 corresponding to the exhaust side oil slinger unit 82 is formed. That is, the diaphragm fixing unit 100 is formed to be longer than a length of the casing 4 in the axial direction Da. In addition, members that can fix a wire such as an eyebolt are separated away from each other in the axial direction Da and are fixed to an outer peripheral surface of the diaphragm fixing unit 100.

The first rotor supporting unit 110 is integrally formed with the diaphragm fixing unit 100. The first rotor supporting unit 110 extends from an end portion of the diaphragm fixing unit 100, which is on one side of the axial direction Da, in a direction (the radial direction Dr) orthogonal to a direction (the axial direction Da) where the diaphragm fixing unit 100 extends. The first rotor supporting unit 110 can support one end portion of the rotor shaft 21 in the axial direction Da. A first insertion hole 111 that allows the rotor shaft 21 to be inserted therein is formed in the first rotor supporting unit 110. The first insertion hole 111 is formed such that a position of a central axis of the first insertion hole 111 in the radial direction Dr matches the axis Ar when the rotor shaft 21 is supported. The first insertion hole 111 is a hole that has a circular shape and penetrates the first rotor supporting unit 110 in the axial direction Da.

The first rotor supporting unit 110 can be divided up and down in the vertical direction Dv with a horizontal surface passing through a center line of the first insertion hole 111 as a division surface. Specifically, the first rotor supporting unit 110 has a first rotor supporting unit main body 115 integrated with the diaphragm fixing unit 100 and a first rotor supporting unit divided body 116 that can be fixed to the first rotor supporting unit main body 115 by a fastening member such as a bolt (not shown). The first rotor supporting unit main body 115 has a recessed portion that is depressed from an end surface, which faces the lower side of the vertical direction Dv, toward the upper side of the vertical direction Dv such that an upper half portion of the first insertion hole 111 is formed. The first rotor supporting unit divided body 116 has a recessed portion that is depressed from an end surface, which faces the upper side of the vertical direction Dv, toward the lower side of the vertical direction Dv such that a lower half portion of the first insertion hole 111 is formed.

The first rotor supporting unit 110 regulates a movement range of the rotor 2 in the vertical direction Dv to be within a range smaller than a distance of a minimum gap between the upper half diaphragm 31 and the rotor 2 in the vertical direction Dv. Specifically, the gap between the upper half diaphragm 31 and the rotor 2 in the vertical direction Dv is smallest between an end portion of the upper half diaphragm 31 on an inner side in the radial direction Dr and the outer circumferential surface of the rotor shaft 21. In the first rotor supporting unit 110 of the embodiment, a distance from the outer circumferential surface of the rotor shaft 21 to an inner circumferential surface of the first insertion hole 111 in the vertical direction Dv is shorter than the distance of the gap between the end portion of the upper half diaphragm 31 on the inner side in the radial direction Dr and the outer circumferential surface of the rotor shaft 21.

In addition, the first rotor supporting unit 110 has an axial direction position adjusting unit 150 that is configured to adjust a position of the rotor shaft 21 in the axial direction Da. The axial direction position adjusting unit 150 of the embodiment adjusts relative movement of the rotor shaft 21 in the axial direction Da with respect to the diaphragm fixing unit 100 by coming into contact with the rotor shaft 21 in the axial direction Da. Specifically, an adjusting protrusion portion 151 that can be inserted into the oil slinger groove 55 is provided as the axial direction position adjusting unit 150. The adjusting protrusion portion 151 is formed on each of the first rotor supporting unit main body 115 and the first rotor supporting unit divided body 116 to protrude from the inner circumferential surface of the first insertion hole 111. The adjusting protrusion portion 151 is in contact with an inner surface of the oil slinger groove 55 in the axial direction Da in a state of being fitted in the oil slinger groove 55.

The second rotor supporting unit 120 is integrally formed with the diaphragm fixing unit 100 at a position separated away from the first rotor supporting unit 110 in the axial direction Da. The second rotor supporting unit 120 extends in the radial direction Dr from an end portion of the diaphragm fixing unit 100 on the other side of the axial direction Da. That is, the second rotor supporting unit 120 extends in parallel with the first rotor supporting unit 110. The second rotor supporting unit 120 can support the other end portion of the rotor shaft 21 in the axial direction Da. A second insertion hole 121 that allows the rotor shaft 21 to be inserted therein is formed in the first rotor supporting unit 110. The second insertion hole 121 is formed at the same position as the first insertion hole 111 when seen from the axial direction Da. The second insertion hole 121 is a hole that has a circular shape having the same size as the first insertion hole 111 and penetrates the second rotor supporting unit 120 in the axial direction Da.

The second rotor supporting unit 120 can be divided up and down in the vertical direction Dv with a horizontal surface passing through a center line of the second insertion hole 121 as a division surface. Specifically, the second rotor supporting unit 120 has a second rotor supporting unit main body 125 integrated with the diaphragm fixing unit 100 and a second rotor supporting unit divided body 126 that can be fixed to the second rotor supporting unit main body 125 by a fastening member such as a bolt (not shown). The second rotor supporting unit main body 125 has a recessed portion that is depressed from an end surface, which faces the lower side of the vertical direction Dv, toward the upper side of the vertical direction Dv such that an upper half portion of the second insertion hole 121 is formed. The second rotor supporting unit divided body 126 has a recessed portion that is depressed from an end surface, which faces the upper side of the vertical direction Dv, toward the lower side of the vertical direction Dv such that a lower half portion of the second insertion hole 121 is formed.

Just as the first rotor supporting unit 110, the second rotor supporting unit 120 regulates a movement range of the rotor shaft 21 in the vertical direction Dv by means of the second insertion hole 121 to be within a range smaller than the distance of the minimum gap between the upper half diaphragm 31 and the rotor 2 in the vertical direction Dv. In the embodiment, the distance from the outer circumferential surface of the rotor shaft 21 to the inner circumferential surface of the first insertion hole 111 in the vertical direction Dv is the same as a distance from the outer circumferential surface of the rotor shaft 21 to an inner circumferential surface of the second insertion hole 121. That is, the distance from the outer circumferential surface of the rotor shaft 21 to the inner circumferential surface of the second insertion hole 121 in the vertical direction Dv is shorter than distance of the gap between the end portion of the upper half diaphragm 31 on the inner side in the radial direction Dr and the outer circumferential surface of the rotor shaft 21. In addition, also the second rotor supporting unit 120 has the axial direction position adjusting unit 150 which is the same as the first rotor supporting unit 110.

Next, a component replacement method of a steam turbine S1 of the embodiment will be described. The component replacement method of a steam turbine S1 of the embodiment includes a lifting jig preparation step S21, an upper side opening step S22, a lifting jig attachment step S24, an internal component removal step S25, a new component preparation step S3, a holding body preparation step S4, a holding body disposing step S5, a lifting jig removal step S6, an oil slinger unit disposing step S7, an internal housing disposing step S8, an upper half casing disposing step S9, and an external housing disposing step S10.

In the lifting jig preparation step S21, the lifting jig 10 is manufactured and prepared. The lifting jig 10 prepared in the lifting jig preparation step S21 is manufactured in a state where the first rotor supporting unit 110 and the second rotor supporting unit 120 are integrated with the diaphragm fixing unit 100. In addition, the first rotor supporting unit 110 and the second rotor supporting unit 120 can be divided up and down in the vertical direction Dv with a horizontal surface passing through the center line of the first insertion hole 111 and the center line of the second insertion hole 121 as a division surface.

In the upper side opening step S22, components are removed such that an upper side of the rotor 2 and an upper side of the diaphragm 3 are opened. The upper side opening step S22 of the embodiment includes an external housing removal step S221, an upper half casing removal step S222, an internal housing removal step S223, and an oil slinger unit removal step S224.

Figure 5:
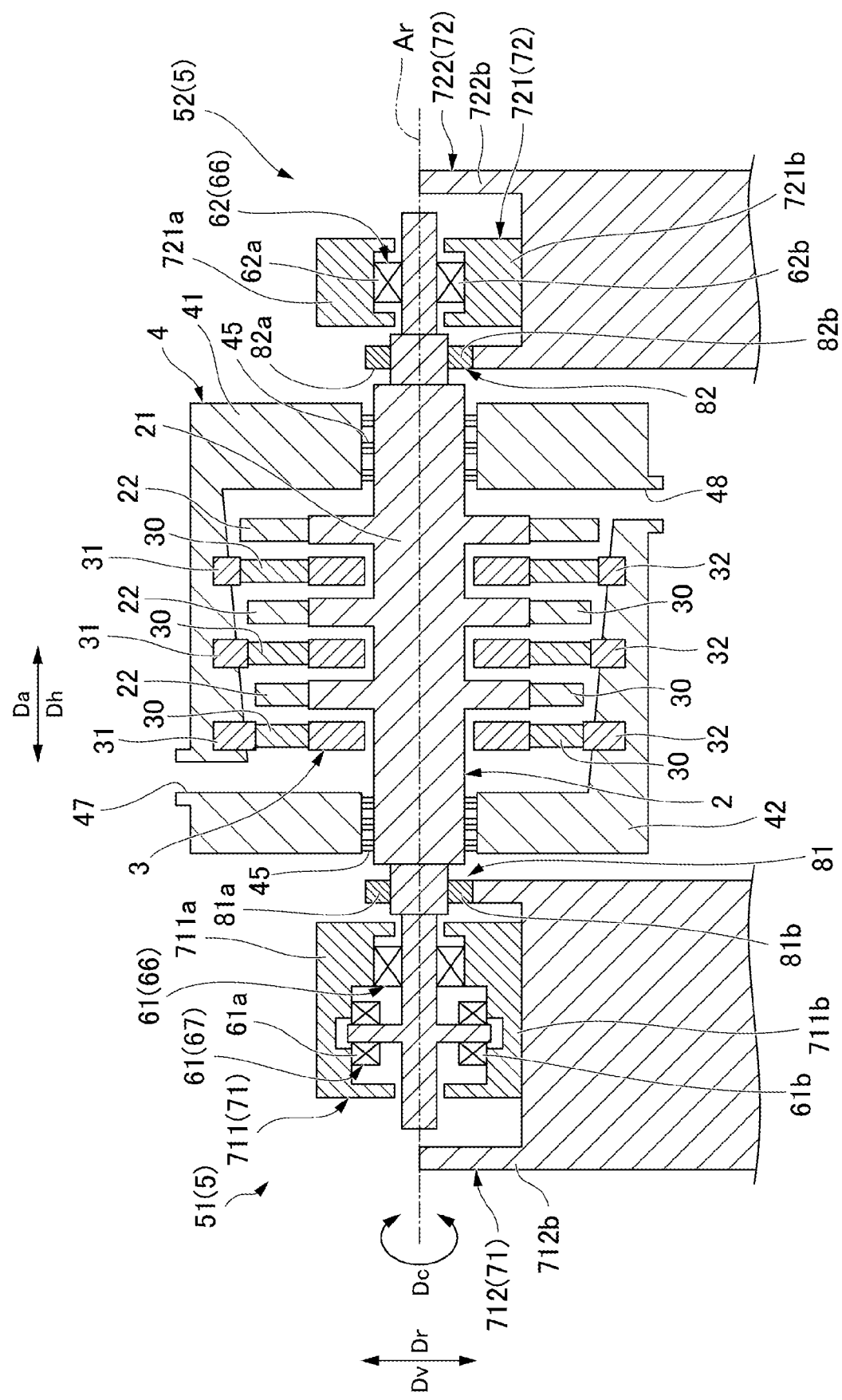
FIG. 5 is a sectional view showing an external housing removal step of the present disclosure.

The external housing removal step S221 is executed after the lifting jig preparation step S21. In the external housing removal step S221, upper half portions of the governor side pedestal cover 712 and the exhaust side pedestal cover 722 are removed. Specifically, in the external housing removal step S221, fixing between the governor side cover 712a and the governor side pedestal 712b in the governor side pedestal cover 712 that can be divided with the division surface is released. After then, the governor side cover 712a is temporarily raised to the upper side of the vertical direction Dv with the use of a crane. Accordingly, as shown in FIG. 5, the governor side cover 712a is removed from the governor side pedestal 712b. Similarly, also in the exhaust side pedestal cover 722, the exhaust side cover 722a is removed from the exhaust side pedestal 722b.

Figure 6:
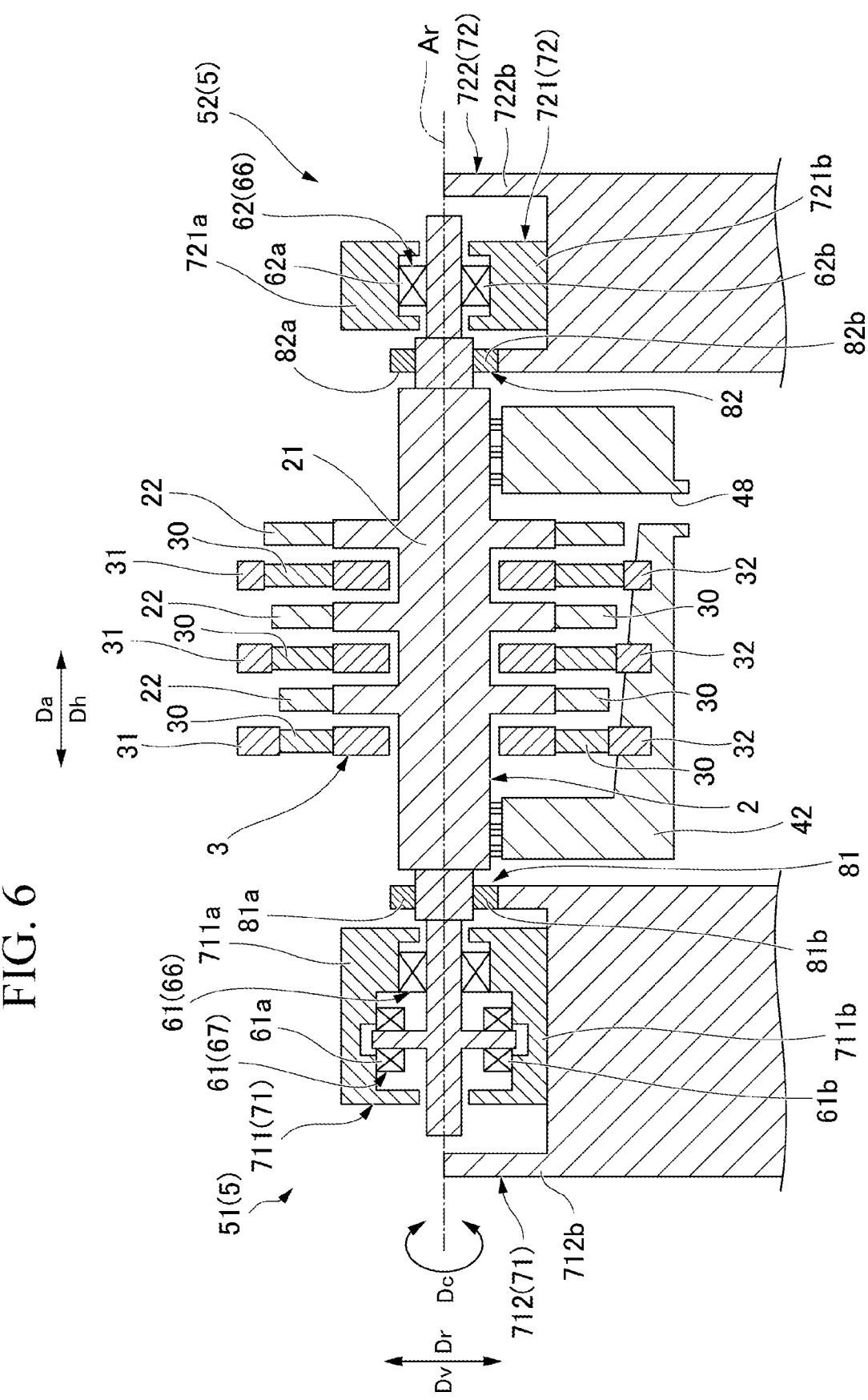
FIG. 6 is a sectional view showing an upper half casing removal step of the present disclosure.

The upper half casing removal step S222 is executed after the external housing removal step S221. In the upper half casing removal step S222, the upper half casing 41 is removed. Specifically, in the upper half casing removal step S222, fixing between the upper half casing 41 and the lower half casing 42 is released. After then, the upper half casing 41 is temporarily raised to the upper side of the vertical direction Dv with the use of the crane. Accordingly, as shown in FIG. 6, the upper half casing 41 is removed from the lower half casing 42.

Figure 7:
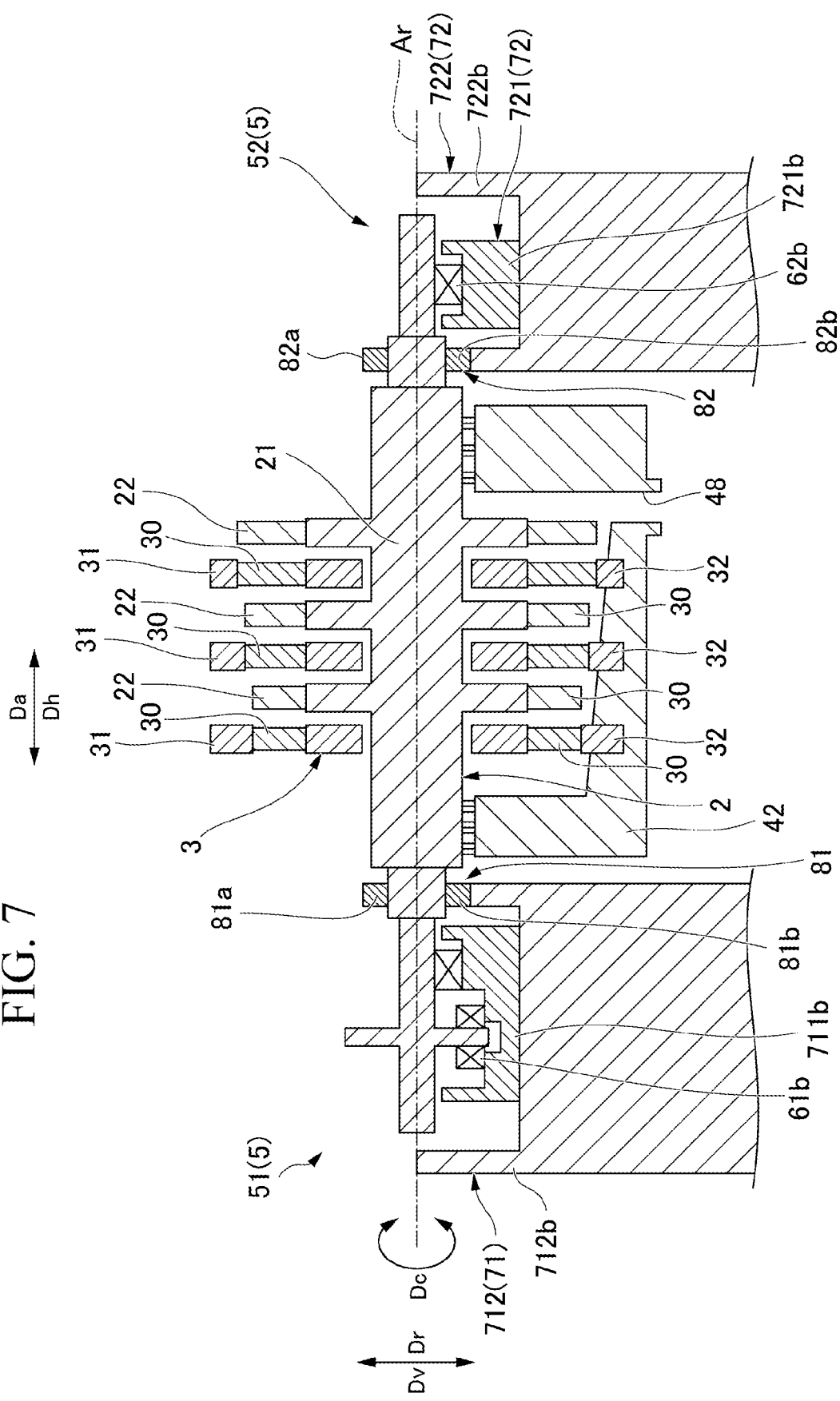
FIG. 7 is a sectional view showing an internal housing removal step of the present disclosure.

The internal housing removal step S223 is executed after the upper half casing removal step S222. In the internal housing removal step S223, upper half portions of the governor side housing 711 and the exhaust side housing 721 are removed. Specifically, in the internal housing removal step S223, fixing between the upper half governor side housing 711a and the lower half governor side housing 711b in the governor side housing 711 that can be divided with the division surface is released. After then, the upper half governor side housing 711a is temporarily raised to the upper side of the vertical direction Dv with the use of the crane. Accordingly, as shown in FIG. 7, the upper half governor side housing 711a and the upper half thrust bearing 61a are removed from the lower half governor side housing 711b fixed to the governor side pedestal 712b. Similarly, also in the exhaust side bearing unit 52, the upper half exhaust side housing 721a and the upper half exhaust side bearing 62a are removed from the lower half exhaust side housing 721b.

Figure 8:
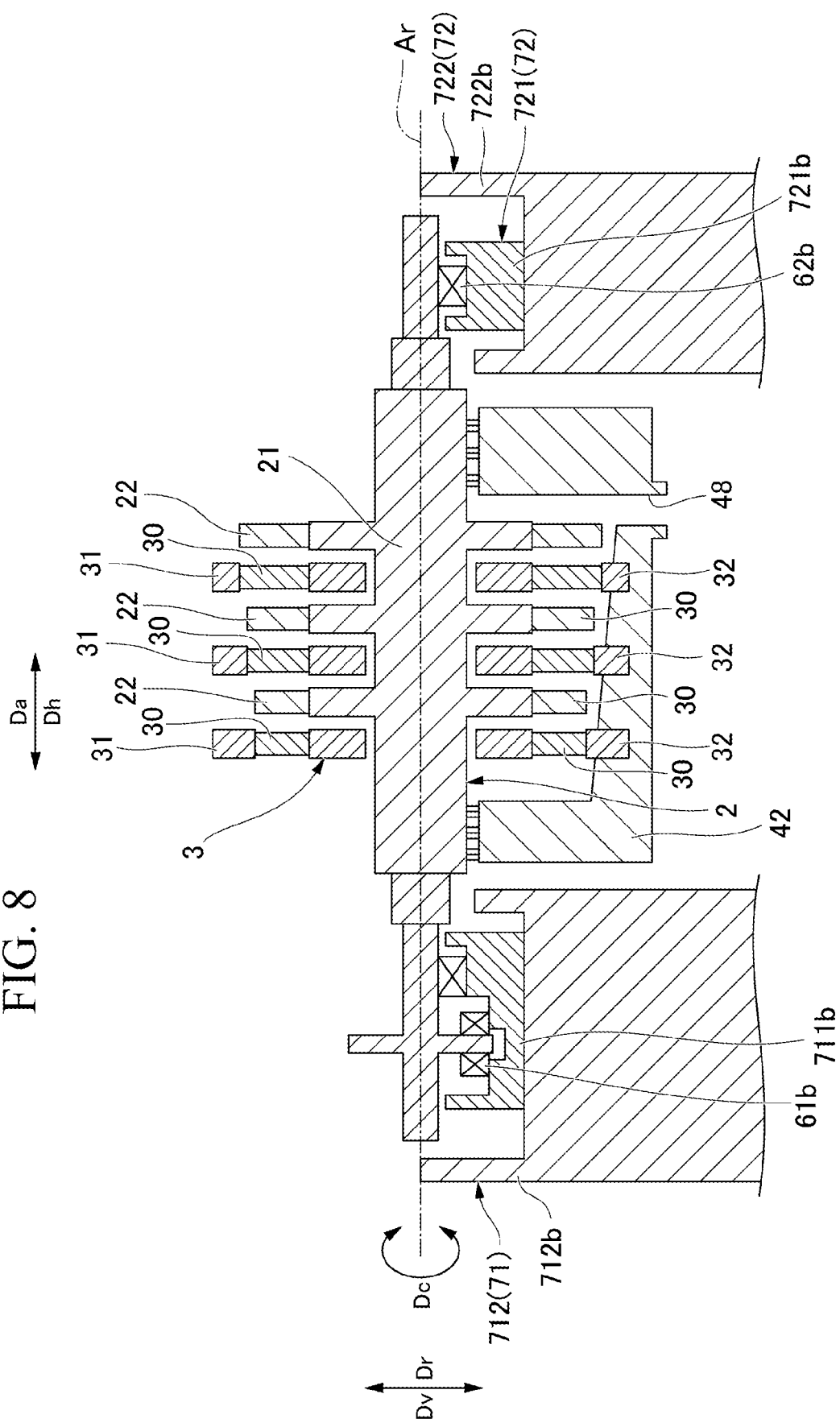
FIG. 8 is a sectional view showing an oil slinger unit removal step of the present disclosure.
Figure 9:
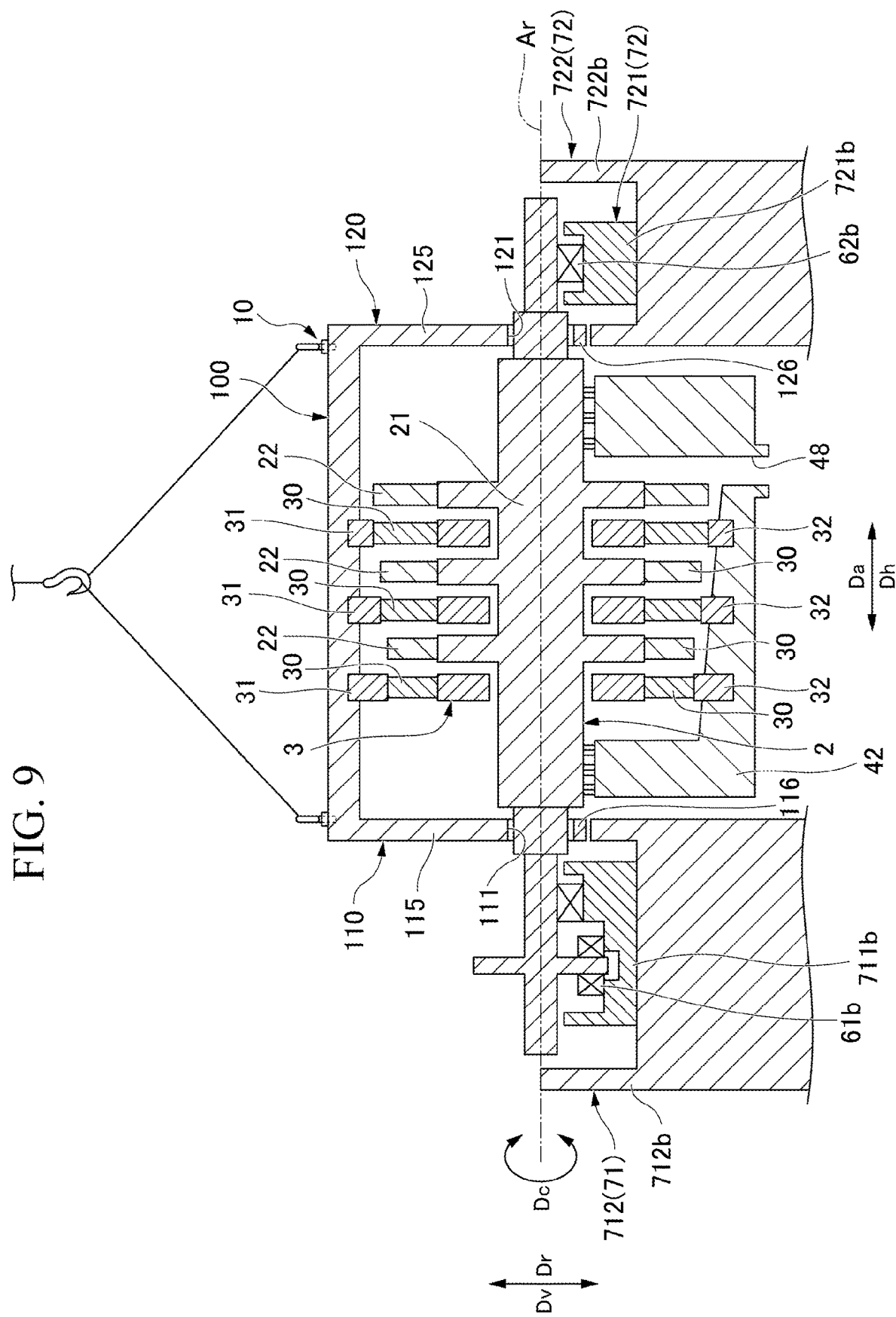
FIG. 9 is a sectional view showing a lifting jig attachment step of the present disclosure.

The oil slinger unit removal step S224 is executed after the internal housing removal step S223. In the oil slinger unit removal step S224, the governor side oil slinger unit 81 and the exhaust side oil slinger unit 82 are removed. Specifically, in the oil slinger unit removal step S224, fixing between the upper half governor side oil slinger unit 81a and the lower half governor side oil slinger unit 81b in the governor side oil slinger unit 81 that can be divided with the division surface is released. After then, as shown in FIG. 8, the upper half governor side oil slinger unit 81a and the lower half governor side oil slinger unit 81b are removed from the governor side pedestal 712b. Similarly, the upper half exhaust side oil slinger unit 82a and the lower half exhaust side oil slinger unit 82b are removed from the exhaust side pedestal 722b.

The lifting jig attachment step S24 is executed after the oil slinger unit removal step S224. In the lifting jig attachment step S24, the diaphragm fixing unit 100 is disposed above the upper half diaphragms 31 in a state where fixing of the first rotor supporting unit divided body 116 to the first rotor supporting unit main body 115 and fixing of the second rotor supporting unit divided body 126 to the second rotor supporting unit main body 125 are released. At that time, the diaphragm fixing unit 100 is adjusted such that a position of the adjusting protrusion portion 151 in the axial direction Da overlaps a position of the oil slinger groove 55 in the axial direction Da.

In addition, in the lifting jig attachment step S24, the first rotor supporting unit divided body 116 and the second rotor supporting unit divided body 126 are disposed below the rotor shaft 21. At that time, each of the first rotor supporting unit divided body 116 and the second rotor supporting unit divided body 126 is adjusted such that the position of the adjusting protrusion portion 151 in the axial direction Da overlaps the position of the oil slinger groove 55 in the axial direction Da. After then, in a state of being disposed inside the diaphragm fixing unit 100 in the radial direction Dr, the plurality of upper half diaphragms 31 are fixed to the diaphragm fixing unit 100 by a fastening member from outside the diaphragm fixing unit 100 in the radial direction Dr. By the upper half diaphragms 31 being fixed to the diaphragm fixing unit 100, the adjusting protrusion portions 151 on the first rotor supporting unit main body 115 and the second rotor supporting unit main body 125 come into a state of being fitted into the oil slinger grooves 55. After then, in a state where the adjusting protrusion portion 151 on the first rotor supporting unit divided body 116 is fitted in the oil slinger groove 55, the first rotor supporting unit main body 115 and the first rotor supporting unit divided body 116 are fixed to each other. Similarly, in a state where the adjusting protrusion portion 151 on the second rotor supporting unit main body 125 is fitted in the oil slinger groove 55, the second rotor supporting unit main body 125 and the second rotor supporting unit divided body 126 are fixed to each other. Accordingly, the lifting jig 10 are attached to the rotor 2 to the diaphragm 3.

The internal component removal step S25 is executed after the lifting jig attachment step S24. In the internal component removal step S25, the lifting jig 10 is lifted above the lower half casing 42 in the vertical direction Dv with the use of the crane. Accordingly, the rotor 2 and the diaphragm 3 are removed from the lower half casing 42 along with the lifting jig 10.

The steam turbine 1 is disassembled through the lifting jig preparation step S21, the upper side opening step S22, the lifting jig attachment step S24, and the internal component removal step S25 described above. That is, a disassembling method of a steam turbine S2 includes the lifting jig preparation step S21, the upper side opening step S22, the lifting jig attachment step S24, and the internal component removal step S25. Maintenance is performed on the rotor 2 and the diaphragm 3 which are removed from the lower half casing 42.

The new component preparation step S3 is simultaneously executed when executing any one of the steps of the disassembling method of a steam turbine S2. In the new component preparation step S3, the upper half diaphragms 31, the lower half diaphragms 32, the rotor 2, and the lifting jig 10 are newly manufactured and prepared separately from the components provided in the disassembled steam turbine 1. That is, the upper half diaphragms 31, the lower half diaphragms 32, the rotor 2, and the lifting jig 10, which are prepared in the new component preparation step S3, are components different from the upper half diaphragms 31, the lower half diaphragms 32, and the rotor 2, which are removed in the internal component removal step S25, and the lifting jig 10 which is being used.

The holding body preparation step S4 is executed after the new component preparation step S3. In the holding body preparation step S4, a holding body is prepared with the upper half diaphragms 31, the lower half diaphragms 32, the rotor 2, and the lifting jig 10, which are newly prepared in the new component preparation step S3. Specifically, in the holding body preparation step S4, the plurality of upper half diaphragms 31 newly prepared in the new component preparation step S3 are fixed to the diaphragm fixing unit 100. A position of the newly prepared rotor 2 is adjusted with respect to the diaphragm fixing unit 100 such that the position of the adjusting protrusion portion 151 in the axial direction Da overlaps the position of the oil slinger groove 55 in the axial direction Da. Positions of the first rotor supporting unit divided body 116 and the second rotor supporting unit divided body 126 are adjusted with respect to the rotor 2 after the position adjustment and are disposed below the rotor shaft 21 such that the position of the adjusting protrusion portion 151 in the axial direction Da overlaps the position of the oil slinger groove 55 in the axial direction Da. After then, in a state where the adjusting protrusion portion 151 is fitted in the oil slinger groove 55, the first rotor supporting unit divided body 116 is fixed to the first rotor supporting unit main body 115. Similarly, in a state where the adjusting protrusion portion 151 is fitted in the oil slinger groove 55, the second rotor supporting unit divided body 126 is fixed to the second rotor supporting unit main body 125. Accordingly, a state where the upper half diaphragms 31 and the rotor 2 are supported by the lifting jig 10 is caused. After then, the newly prepared lower half diaphragms 32 are fixed to the upper half diaphragms 31. In such a manner, in the holding body preparation step S4, the holding body in which relative positions of the rotor 2 and the diaphragm 3 with respect to the lifting jig 10 are held is prepared. That is, the holding body has the lifting jig 10, the rotor 2, and the diaphragm 3.

The holding body disposing step S5 is executed after the holding body preparation step S4 and after the internal component removal step S25. In the holding body disposing step S5, the holding body prepared in the holding body preparation step S4 is lowered to the lower half casing 42 from the upper side of the vertical direction Dv. Accordingly, in a state where the lower half diaphragms 32 are disposed on an inner circumferential side of the lower half casing 42, the holding body is disposed.

The lifting jig removal step S6 is executed after the holding body disposing step S5. In the lifting jig removal step S6, the lifting jig 10 is removed from the holding body disposed on the lower half casing 42. Specifically, fixing of the first rotor supporting unit divided body 116 to the first rotor supporting unit main body 115 is released, and thus the first rotor supporting unit divided body 116 is removed. Fixing of the second rotor supporting unit divided body 126 to the second rotor supporting unit main body 125 is released, and thus the second rotor supporting unit divided body 126 is removed. In addition, fixing between the plurality of upper half diaphragms 31 and the diaphragm fixing unit 100 is released. After then, by the diaphragm fixing unit 100 being lifted to the upper side of the vertical direction Dv, the first rotor supporting unit main body 115 and the second rotor supporting unit main body 125 are separated away from the rotor shaft 21. In such a manner, the lifting jig 10 are removed from the rotor 2 and the diaphragm 3.

The oil slinger unit disposing step S7 is executed after the lifting jig removal step S6. In the oil slinger unit disposing step S7, the governor side oil slinger unit 81 and the exhaust side oil slinger unit 82 are attached to correspond to positions where the oil slinger grooves 55 are formed in the rotor shaft 21.

The internal housing disposing step S8 is executed after the oil slinger unit disposing step S7. In the internal housing disposing step S8, the upper half thrust bearing 61a is lowered to the lower half thrust bearing 61b accommodated in the lower half governor side housing 711b from the upper side of the vertical direction Dv. After then, the lower half thrust bearing 61b and the upper half thrust bearing 61a are fixed to each other, thereby forming the thrust bearing unit 61. After the thrust bearing unit 61 is formed, the upper half governor side housing 711a is lowered to the lower half governor side housing 711b from the upper side of the vertical direction Dv. After then, the lower half governor side housing 711b and the upper half governor side housing 711a are fixed to each other, thereby forming the governor side housing 711. Similarly, the upper half exhaust side bearing 62a and the upper half exhaust side housing 721a are attached to the lower half exhaust side bearing 62b and the lower half exhaust side housing 721b, thereby forming the exhaust side bearing 62 and the exhaust side housing 721.

The upper half casing disposing step S9 is executed after the internal housing disposing step S8. In the upper half casing disposing step S9, the upper half casing 41 is temporarily raised above the upper half diaphragms 31 to the upper side of the vertical direction Dv with the use of the crane in a state where the rotor 2 and the diaphragm 3 are fitted in the lower half casing 42. After then, the upper half casing 41 is lowered to the upper half diaphragms 31 from the upper side of the vertical direction Dv such that the upper half diaphragms 31 are fitted on an inner circumferential side of the upper half casing 41. At that time, the upper half casing 41 is lowered until a position where the division surfaces of the upper half casing 41 and the division surfaces of the lower half casing 42 come into contact with each other. In a state where the division surfaces are in contact with each other, the upper half casing 41 and the lower half casing 42 are fixed to each other, thereby forming the casing 4.

The external housing disposing step S10 is executed after the upper half casing disposing step S9. In the external housing disposing step S10, the governor side cover 712a is lowered to the governor side pedestal 712b from the upper side of the vertical direction Dv while a position corresponding to the governor side oil slinger unit 81 in the axial direction Da is adjusted. After then, the governor side pedestal 712b and the governor side cover 712a are fixed to each other, thereby forming the governor side pedestal cover 712. Similarly, the exhaust side cover 722a is attached to the exhaust side pedestal 722b, and the exhaust side pedestal cover 722 is formed. As a result, the steam turbine 1 of which internal components are replaced is finished.

In the lifting jig 10 and the component replacement method of steam turbine 51 described above, the diaphragm 3 and the rotor 2 can be simultaneously lifted with only one jig. The first rotor supporting unit 110 and the second rotor supporting unit 120, which support the rotor shaft 21, are integrally formed with the diaphragm fixing unit 100 to which the upper half diaphragms 31 are fixed. For this reason, even when the rotor 2 and the diaphragm 3 are moved by the lifting jig 10, a significant shift in a relative position of the rotor 2 with respect to the upper half diaphragms 31 can be suppressed. Therefore, work such as position adjustment when moving the rotor 2 and the diaphragm 3 can be reduced. That is, disassembly and assembly of the rotor 2 and the diaphragm 3 into the steam turbine 1 can be performed by the lifting jig 10 in a short period of time.

In addition, the movement range of the rotor 2 is regulated by the first insertion hole 111 and the second insertion hole 121 to be within the length of the minimum gap between the upper half diaphragm 31 and the rotor shaft 21. For this reason, even when the rotor 2 and the diaphragm 3 are moved by the lifting jig 10, relatively large movement of the rotor 2 with respect to the upper half diaphragms 31 can be suppressed while on the move. Therefore, the diaphragm 3 and the rotor 2 can be prevented from coming into contact with each other.

In addition, a distance from the inner circumferential surface of the first insertion hole 111 or the second insertion hole 121 to the outer circumferential surface of the rotor shaft 21 in the vertical direction Dv is shorter than the distance of the gap between the end portion of the upper half diaphragm 31 on the inner side in the radial direction Dr and the outer circumferential surface of the rotor shaft 21. For this reason, even when the relative position of the rotor 2 with respect to the diaphragm 3 shifts while the rotor 2 and the diaphragm 3 are being moved by the lifting jig 10, the outer circumferential surface of the rotor shaft 21 comes into contact with the inner circumferential surfaces of the first insertion hole 111 and the second insertion hole 121 before the rotor 2 and the diaphragm 3 come into contact with each other. Therefore, the rotor 2 and the diaphragm 3 can be prevented from coming into contact with each other while on the move.

In addition, in the first rotor supporting unit 110 and the second rotor supporting unit 120, also the position of the rotor shaft 21 in the axial direction Da is adjusted by the adjusting protrusion portion 151. For this reason, when the rotor 2 and the diaphragm 3 are moved by the lifting jig 10, movement of the rotor 2, which is on the move, in the axial direction Da can be suppressed. For this reason, even when the rotor 2 and the diaphragm 3 are moved by the lifting jig 10, a significant shift in the relative position of the rotor 2 with respect to the upper half diaphragms 31 in the axial direction Da can be suppressed. Therefore, the rotor 2 and the diaphragm 3 can be accurately prevented from coming into contact with each other while on the move.

In addition, the rotor 2 and the diaphragm 3 are moved by the lifting jig 10 in a state where the adjusting protrusion portion 151 is fitted in the oil slinger groove 55. For this reason, it is not necessary to newly form, in the rotor shaft 21, a structure of adjusting movement of the rotor shaft 21, which is on the move, in the axial direction Da. That is, the movement of the rotor 2, which is on the move, in the axial direction Da can be adjusted with the use of the oil slinger groove 55.

In addition, the rotor 2 and the diaphragm 3 can be simultaneously removed from the lower half casing 42 by the lifting jig 10. Therefore, work time taken for disassembling the steam turbine 1 can be significantly reduced.

In addition, position adjustment between components when disposing the rotor 2 and the diaphragm 3 with respect to the lower half casing 42 can be omitted by attaching the holding body to the lower half casing 42. Therefore, work time taken for replacing the internal components of the steam turbine 1 at the time of maintenance can be significantly reduced.

By forming a holding body with new components, the rotor 2 and the diaphragm 3 can be attached to the lower half casing 42 immediately after removing the rotor 2 and the diaphragm 3 from the lower half casing 42. Therefore, time it takes for the steam turbine 1 to be in an operable state can be significantly reduced compared to a case of returning the removed rotor 2 and the removed diaphragm 3 after maintenance such as repair is performed thereon.

Another Modification Example of Embodiment

While preferred embodiments of the disclosure have been described and shown above, it should be understood that these are exemplary examples of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

For example, the first rotor supporting unit 110 and the second rotor supporting unit 120 are not limited to a structure of supporting the rotor shaft 21 with the use of the first insertion hole 111 and the second insertion hole 121. Specifically, the first rotor supporting unit 110 and the second rotor supporting unit 120 may have a structure of being directly fixed to the rotor shaft 21 by a fastening member such as a bolt and supporting the rotor shaft.

In addition, the axial direction position adjusting units 150 in the first rotor supporting unit 110 and the second rotor supporting unit 120 are not limited to the adjusting protrusion portions 151 that can be inserted into the oil slinger grooves 55 as in the embodiment. It is sufficient that the axial direction position adjusting unit 150 can adjust the movement of the rotor shaft 21 in the axial direction Da. For example, the axial direction position adjusting unit 150 may have a structure of coming into contact with a step formed on the rotor shaft 21 in the axial direction Da, or may have a structure of directly fixing the first rotor supporting unit 110 and the second rotor supporting unit 120 to the rotor shaft 21.

In addition, the lifting jig preparation step S21 is not limited to being executed before the upper side opening step S22. It is sufficient for the lifting jig preparation step S21 to be executed before the lifting jig attachment step S24. For example, the lifting jig preparation step S21 may be simultaneously executed with the upper side opening step S22.

In addition, execution order of the external housing removal step S221, the upper half casing removal step S222, the internal housing removal step S223, and the oil slinger unit removal step S224 in the upper side opening step S22, is not limited to execution order of the embodiment. For example, the upper half casing removal step S222 may be executed after the external housing removal step S221, the internal housing removal step S223, and the oil slinger unit removal step S224.

In addition, the lifting jig attachment step S24 is not limited to being executed after the oil slinger unit removal step S224. For example, in a case where the first rotor supporting unit 110 and the second rotor supporting unit 120 support a position shifted away from a position where the oil slinger unit is disposed in the axial direction Da, the oil slinger units may be supported along with the rotor shaft 21 without executing the oil slinger unit removal step S224 and without removing the oil slinger units.

In addition, a component used in the holding body preparation step S4 is not limited to a component newly manufactured in the new component preparation step S3 as in the embodiment. Maintenance such as repair may be performed on a component removed in the internal component removal step S25, and the removed component may be reused to form the holding body. In addition, in a case where the holding body is formed in the holding body preparation step S4 with the use of the component removed in the internal component removal step S25, the holding body preparation step S4 is executed after the internal component removal step S25.

In addition, the new component preparation step S3 is not limited to being simultaneously executed with the disassembling method of a steam turbine S2. The new component preparation step S3 may be executed before or after the disassembling method of a steam turbine S2.

The lifting jig 10 is not limited to being used only at the time of disassembly or at the time of component replacement of the steam turbine 1 as in the embodiment. The lifting jig 10 may be used when newly assembling the steam turbine 1. For example, a manufacturing method of a steam turbine S100 in which the lifting jig 10 is used will be described a second embodiment. In the second embodiment, the same configuration elements as the first embodiment will be assigned with the same reference signs, and detailed description thereof will be omitted.

As shown in FIG. 10, in the manufacturing method of a steam turbine S100 which is the second embodiment, the steam turbine 1 is newly assembled with the use of the lifting jig 10. The manufacturing method of a steam turbine S100 includes a component preparation step S31, the lifting jig preparation step S21, a holding body preparation step S41, a holding body disposing step S51, a lifting jig removal step S61, and an upper half casing disposing step S91.

In the component preparation step S31, components necessary for manufacturing the steam turbine 1 are prepared. Specifically, the casing 4, the diaphragm 3, and the rotor 2 are manufactured and prepared.

The lifting jig preparation step S21 is executed after the component preparation step S31. In the lifting jig preparation step S21 of the second embodiment, the lifting jig 10 is manufactured and prepared as in the first embodiment.

The holding body preparation step S41 is executed after the lifting jig preparation step S21. In the holding body preparation step S41 of the second embodiment, the plurality of upper half diaphragms 31 prepared in the component preparation step S31 is fixed to the diaphragm fixing unit 100. After then, in a state where the rotor shaft 21 is inserted in the first insertion hole 111, the first rotor supporting unit divided body 116 is fixed to the first rotor supporting unit main body 115. Similarly, in a state where the rotor shaft 21 is inserted in the second insertion hole 121, the second rotor supporting unit divided body 126 is fixed to the second rotor supporting unit main body 125. Accordingly, a state where the upper half diaphragms 31 and the rotor 2 are supported by the lifting jig 10 is caused. After then, the lower half diaphragms 32 prepared in the component preparation step S31 are fixed to the upper half diaphragms 31. In such a manner, in the holding body preparation step S41, the holding body in which relative positions of the rotor 2 and the diaphragm 3 with respect to the lifting jig 10 are held is prepared.

The holding body disposing step S51 is executed after the holding body preparation step S41. In holding body disposing step S51, the holding body prepared in the holding body preparation step S41 is lowered to the lower half casing 42 prepared in the component preparation step S31 from the upper side of the vertical direction Dv. Accordingly, in a state where the lower half diaphragms 32 are disposed on an inner circumferential side of the lower half casing 42, the holding body is disposed.

The lifting jig removal step S61 is executed after the holding body disposing step S51. In the lifting jig removal step S61, the lifting jig 10 is removed from the rotor 2 and the upper half casing 41 which are disposed on the lower half casing 42 as in the first embodiment.

The upper half casing disposing step S91 is executed after the lifting jig removal step S61. In the upper half casing disposing step S91, the upper half casing 41 is attached to the lower half casing 42 in which the rotor 2 and the diaphragm 3 are fitted, thereby forming the casing 4, as in the first embodiment. As a result, the steam turbine 1 is finished.

In the manufacturing method of a steam turbine S100 described above, work time taken for completing the assembly of the steam turbine 1 can be significantly reduced.

In the manufacturing method of a steam turbine S100 described above, a lower half portion of the bearing unit 5 may be disposed before the holding body disposing step S51 in a case of simultaneously mounting the bearing unit 5 as well. At that time, an upper half portion of the bearing unit 5 is disposed after the lifting jig removal step S61.

EXPLANATION OF REFERENCES

1: steam turbine
Ar: axis
Da: axial direction
Dr: radial direction
Dc: circumferential direction
Dv: vertical direction
Dh: horizontal direction
2: rotor
21: rotor shaft
22: blade
3: diaphragm
30: nozzle
31: upper half diaphragm
32: lower half diaphragm
4: casing
41: upper half casing
42: lower half casing
45: seal device
47: inlet port
48: exhaust port
5: bearing unit
51: governor side bearing unit
61: thrust bearing unit
61a: upper half thrust bearing
61b: lower half thrust bearing
66: journal bearing
67: thrust bearing
71: governor side bearing housing
711: governor side housing
711a: upper half governor side housing
711b: lower half governor side housing
712: governor side pedestal cover
712a: governor side cover
712b: governor side pedestal
81: governor side oil slinger unit
81a: upper half governor side oil slinger unit
81b: lower half governor side oil slinger unit
52: exhaust side bearing unit
62: exhaust side bearing
62a: upper half exhaust side bearing
62b: lower half exhaust side bearing
72: exhaust side bearing housing
721: exhaust side housing
721a: upper half exhaust side housing
721b: lower half exhaust side housing
722: exhaust side pedestal cover
722a: exhaust side cover
722b: exhaust side pedestal
82: exhaust side oil slinger unit
82a: upper half exhaust side oil slinger unit
82b: lower half exhaust side oil slinger unit
55: oil slinger groove
10: lifting jig
100: diaphragm fixing unit
110: first rotor supporting unit
111: first insertion hole
150: axial direction position adjusting unit
151: adjusting protrusion portion
115: first rotor supporting unit main body
116: first rotor supporting unit divided body
120: second rotor supporting unit
121: second insertion hole
125: second rotor supporting unit main body
126: second rotor supporting unit divided body
S1: component replacement method of steam turbine
S2: disassembling method of steam turbine
S21: lifting jig preparation step
S22: upper side opening step
S221: external housing removal step
S222: upper half casing removal step
S223: internal housing removal step
S224: oil slinger unit removal step
S24: lifting jig attachment step
S25: internal component removal step
S3: new component preparation step
S4, S41: holding body preparation step
S5, S51: holding body disposing step
S6, S61: lifting jig removal step
S7: oil slinger unit disposing step
S8: internal housing disposing step
S9, S91: upper half casing disposing step
S10: external housing disposing step
S100: manufacturing method of steam turbine
S31: component preparation step

What is claimed is:

1. A lifting jig that is configured to lift a rotor and a diaphragm of a steam turbine including the rotor that is rotatable about an axis, a casing that is divided with a division surface into an upper half casing on an upper side of a vertical direction and a lower half casing on a lower side of the vertical direction and covers the rotor, and the diaphragm that is divided with a division surface into an upper half diaphragm disposed in the upper half casing and a lower half diaphragm disposed in the lower half casing and extends in a circumferential direction of the rotor, the lifting jig comprising:
- a diaphragm fixing unit that is fixable to the upper half diaphragm;
- a first rotor supporting unit that is integrally formed with the diaphragm fixing unit and that is configured to support one end portion of the rotor in an axial direction where the axis extends; and
- a second rotor supporting unit that is integrally formed with the diaphragm fixing unit at a position separated away from the first rotor supporting unit in the axial direction and that is configured to support an other end portion of the rotor in the axial direction.

2. The lifting jig according to claim 1,
wherein the first rotor supporting unit and the second rotor supporting unit are configured to regulate a movement range of the rotor in the vertical direction to be within a range smaller than a distance of a minimum gap between the upper half diaphragm and the rotor in the vertical direction.

3. The lifting jig according to claim 2,
wherein the first rotor supporting unit has a first insertion hole that allows the rotor to be inserted therein,
the second rotor supporting unit has a second insertion hole that allows the rotor to be inserted therein, and
in the first insertion hole and the second insertion hole, a distance from an outer circumferential surface of the rotor to an inner circumferential surface of the first insertion hole or the second insertion hole in the vertical direction is shorter than the distance of the minimum gap.

4. The lifting jig according to claim 1,
wherein at least one of the first rotor supporting unit and the second rotor supporting unit has an axial direction position adjusting unit that is configured to adjust a position of the rotor in the axial direction.

5. The lifting jig according to claim 4,
wherein the steam turbine includes, outside the casing, a bearing unit that rotatably supports the rotor,
the bearing unit has
- a bearing main body that supports the rotor by using a lubricating oil,
- a bearing housing that accommodates the bearing main body, and
- an oil slinger unit that is provided at an interval with respect to an oil slinger groove formed to be depressed from an outer circumferential surface of the rotor and suppresses leakage of the lubricating oil from an inside of the bearing housing to an outside, and the axial direction position adjusting unit has an adjusting protrusion portion that is allowed to be inserted into the oil slinger groove.

6. The lifting jig according to claim 2,
wherein at least one of the first rotor supporting unit and the second rotor supporting unit has an axial direction position adjusting unit that is configured to adjust a position of the rotor in the axial direction.

7. The lifting jig according to claim 3,
wherein at least one of the first rotor supporting unit and the second rotor supporting unit has an axial direction position adjusting unit that is configured to adjust a position of the rotor in the axial direction.

* * * * *